(12) United States Patent
Ong et al.

(10) Patent No.: US 7,015,968 B2
(45) Date of Patent: Mar. 21, 2006

(54) BACKLIGHT CONTROLLED CLOSEUP PHOTOGRAPHING SYSTEM

(75) Inventors: Soon-Teong Ong, Penang (MY); Yen-Hwong Chong, Penang (MY); Chong-Khai Ng, Penang (MY); Tony Shih-Hsiung Weng, Taipei (TW)

(73) Assignee: Inventec Multimedia & Telecom Corporation, Taipei (TW)

( * ) Notice: Subject to any disclaimer, the term of this patent is extended or adjusted under 35 U.S.C. 154(b) by 60 days.

(21) Appl. No.: 10/459,751

(22) Filed: Jun. 12, 2003

(65) Prior Publication Data

US 2004/0119873 A1 Jun. 24, 2004

(30) Foreign Application Priority Data

Dec. 23, 2002 (TW) .............................. 91136982 A

(51) Int. Cl.
*H04H 5/222* (2006.01)
(52) U.S. Cl. ...................................... 348/370; 348/552
(58) Field of Classification Search ............... 348/207, 348/68, 216.1, 217.1, 227.1, 229.1, 370, 348/234, 96, 333.06, 333.01, 371, 552; 362/23, 362/26, 28, 29, 30; 345/156, 157, 158, 159, 345/160, 161, 102, 204, 211
See application file for complete search history.

(56) References Cited

U.S. PATENT DOCUMENTS

| 5,115,269 A | * | 5/1992 | Masanaga et al. | ............ | 396/106 |
| 5,963,254 A | * | 10/1999 | Kim et al. | ................... | 348/363 |
| 6,339,447 B1 | * | 1/2002 | Kurahashi et al. | ............. | 348/96 |
| 6,452,582 B1 | * | 9/2002 | Rolston | ....................... | 345/102 |
| 6,466,196 B1 | * | 10/2002 | Isogawa et al. | ............. | 345/102 |
| 6,480,226 B1 | * | 11/2002 | Takahashi et al. | ........... | 348/296 |
| 2002/0130830 A1 | * | 9/2002 | Park | ............................ | 345/99 |
| 2002/0163524 A1 | * | 11/2002 | Dutta | ........................... | 345/589 |
| 2002/0171617 A1 | * | 11/2002 | Fuller | ........................... | 345/102 |
| 2003/0128281 A1 | * | 7/2003 | Nihei et al. | ............... | 348/222.1 |
| 2004/0012556 A1 | * | 1/2004 | Yong et al. | .................. | 345/102 |
| 2004/0239799 A1 | * | 12/2004 | Suzuki et al. | ................ | 348/370 |
| 2005/0194447 A1 | * | 9/2005 | He et al. | ................ | 235/472.01 |

FOREIGN PATENT DOCUMENTS

GB 2411065 A * 8/2005

* cited by examiner

*Primary Examiner*—Ngoc-Yen Vu
*Assistant Examiner*—Nelson D. Hernandez
(74) *Attorney, Agent, or Firm*—Fulbright & Jaworski LLP

(57) ABSTRACT

A backlight controlled closeup photographing system is proposed, which is designed for use with a multimedia-capable information platform, such as an MMV (MultiMedia Viewer) device, to allow the user to photograph a small object, such as a business card, at close range with intensified illumination on the object for the purpose of allowing the photographed digital image to have adequate brightness in picture quality. The proposed backlight controlled closeup photographing system is characterized by the use of backlight control to increase the intensity of the backlight illumination on the object being photographed for the purpose of allowing the photographed digital image to have adequate brightness in picture quality. Since the intensity of illumination on the object can be increased without using flash unit, the invention is apparently more cost-effective and advantageous to use than prior art.

9 Claims, 2 Drawing Sheets

BACKLIGHT CONTROLLED CLOSEUP PHOTOGRAPHING SYSTEM

BACKGROUND OF THE INVENTION

1. Field of the Invention

This invention relates to multimedia technology, and more particularly, to a back light controlled closeup photographing system designed for use with a multimedia-capable information platform, such as an MMV (MultiMedia Viewer) device, to allow the user to photograph a small object, such as a business card, at close range with sufficient intensity of illumination on the object for the purpose of allowing the photographed digital image to have adequate brightness in picture quality.

2. Description of Related Art

MMV (MultiMedia Viewer) is a portable multimedia-capable electronic device that allows the user to process various kinds of digitized multimedia files, including, for example, digital photos, digital videos, digital audios, and so on. In addition, some MMV devices are equipped with photographing functionality that allows the user to capture digital images of various objects, such as people, landscapes, flowers, and so on.

One drawback to today's MMV devices with photographing functionality, however, is that when they are used in closeup photography to capture the image of a small object, such as a business card, the captured image would usually lack of adequate brightness in picture quality due to the ambient light being dim and therefore the text on the image of the business card would be unclear to recognize. In addition, when the ambient light is dim, it would require a slower shutter speed and therefore is unsuitable for handheld shooting of the business card by the MMV device.

One solution to the foregoing problem is to attach a flash unit to the MMV device to provide a powerful light source to illuminate the object in closeup photography. This solution allows the user to take bright pictures of any small objects at close ranges and is suitable for handheld shooting of business card by the MMV device. One drawback to this solution, however, is that the addition of a flash unit to an MMV device would considerably increase the MMV device's price, and therefore is a cost-ineffective solution for both the manufacturer and the consumer.

SUMMARY OF THE INVENTION

It is therefore an objective of this invention to provide a backlight controlled closeup photographing system which is capable of photographing a small object, such as a business card, at close range with sufficient intensity of illumination on the object to allow the photographed digital image to have adequate brightness in picture quality.

It is another objective of this invention to provide a backlight controlled closeup photographing system which is capable of capturing a small object's digital image with sufficient intensity of illumination on the object without having to use a flash unit.

The backlight controlled closeup photographing system according to the invention is designed for use with a multimedia-capable information platform, such as an MMV (MultiMedia Viewer) device, to allow the user to photograph a small object, such as a business card, at close range with intensified illumination on the object for the purpose of allowing the photographed digital image to have adequate brightness in picture quality. The backlight controlled closeup photographing system of the invention comprises a main control unit, an imaging module, a display unit, and a backlighting module. In operation when the backlight controlled closeup photographing system of the invention is used to photograph an object in closeup mode, the main control unit commands the display driver to switch off the display unit, and then commands the backlighting control unit to switch on the backlighting module and adjust the frequency of the output backlight from the backlighting module for the purpose of increasing the intensity of the backlight illumination on the object being photographed.

The backlight controlled closeup photographing system according to the invention is characterized by the use of backlight control to increase the intensity of the backlight illumination on the object being photographed for the purpose of allowing the photographed digital image to have adequate brightness in picture quality. Since the intensity of illumination on the object can be increased without using flash unit, the invention is apparently more cost-effective and advantageous to use than prior art.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The backlight controlled closeup photographing system according to the invention is disclosed in full details by way of preferred embodiments in the following with reference to the accompanying drawings.

Figure 1:
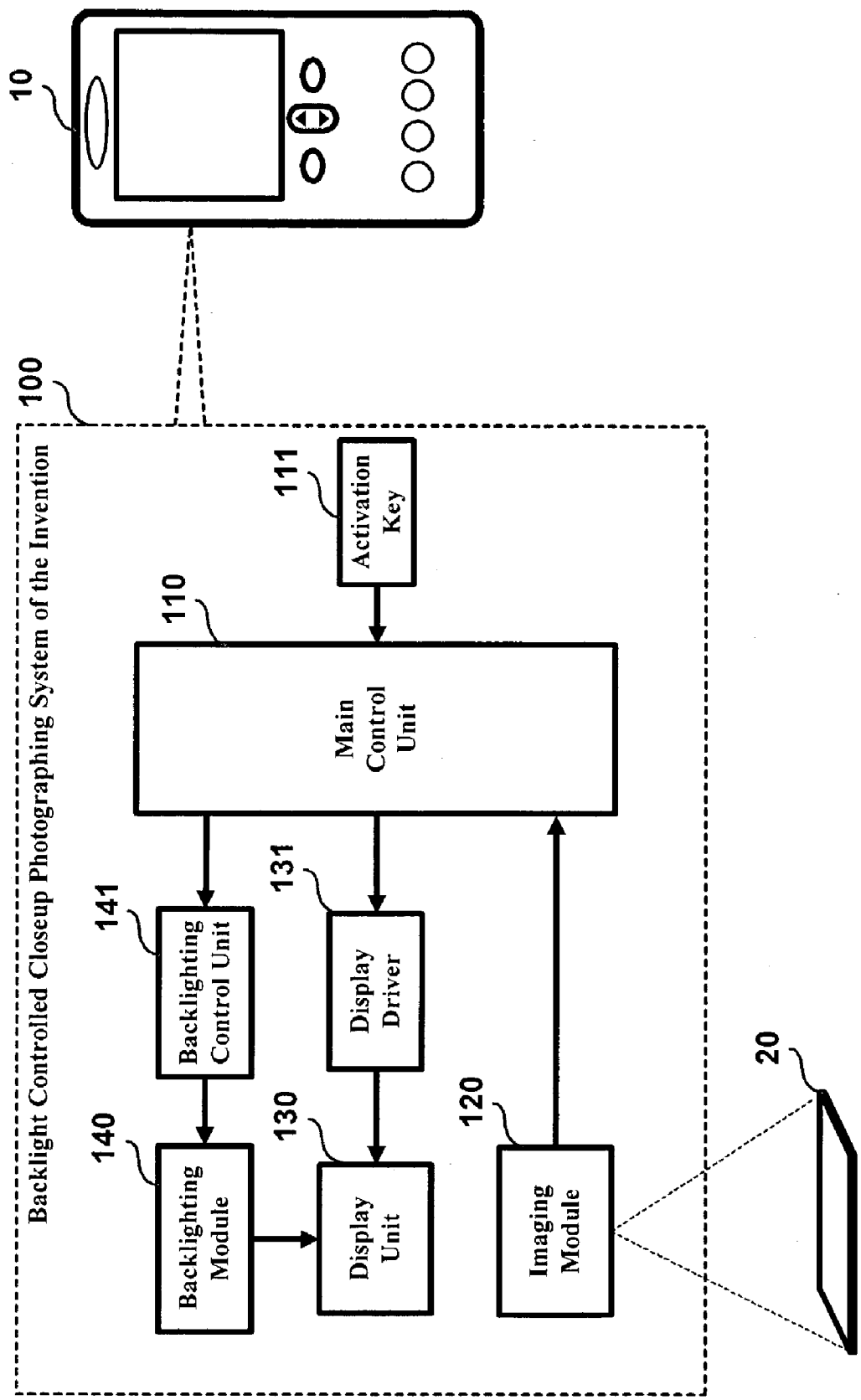
FIG. 1 is a schematic block diagram showing the architecture of the backlight controlled closeup photographing system according to the invention.

FIG. 1 is a schematic block diagram showing the architecture of the backlight controlled closeup photographing system according to the invention (as the part enclosed in the dotted box indicated by the reference numeral 100). As shown, in application, the backlight controlled closeup photographing system of the invention 100 is integrated to an information platform that is equipped with photographing capability, such as an MMV (MultiMedia Viewer) device 10, to allow the user to photograph a small object, such as a business card 20, at close range with sufficient intensity of illumination on the business card 20 so that the photographed digital image of the business card 20 would have adequate brightness in picture quality.

Since the MMV device 10 is a well-known device on the consumer electronic market, its functionality and internal architecture will not be detailed here in this patent specification. In practical use, the backlight controlled closeup photographing system of the invention 100 can be integrated to the internal circuitry of the MMV device 10 to provide a built-in backlight controlled closeup photographing function.

Fundamentally, the backlight controlled closeup photographing system of the invention 100 comprises: (a) a main control unit 110; (b) an imaging module 120; (c) a display unit 130 and an associated display driver 131; (d) a backlighting module 140 and an associated backlighting control unit 141.

The main control unit 110 is, for example, a microprocessor-based control unit, which is used for controlling the operations of the imaging module 120, the display unit 130, the display driver 131, the backlighting module 140, and the backlighting control unit 141.

The imaging module 120 is, for example, a CCD (Charge-Coupled Device) based imaging module, which is capable of capturing the optical image of the business card 20 and converting the captured optical image into digital image.

The display unit 130 is, for example, an LCD (Liquid Crystal Display) based display unit, which is capable of displaying every digital image captured by the imaging module 120 under control by the display driver 131. In addition, the display driver 131 is capable of switching off the display unit 130 while the imaging module 120 is in active operation of capturing the image of the business card 20 so as to increase the intensity of the backlight illumination on the business card 20.

The backlighting module 140 is coupled to the display unit 130 and which is under control by the backlighting control unit 141 for providing a backlight source to illuminate the business card 20; i.e., the backlighting control unit 141 is capable of adjusting the frequency of the output backlight from the backlighting module 140 for the purpose of increasing the intensity of the backlight illumination on the business card 20.

Figure 2:
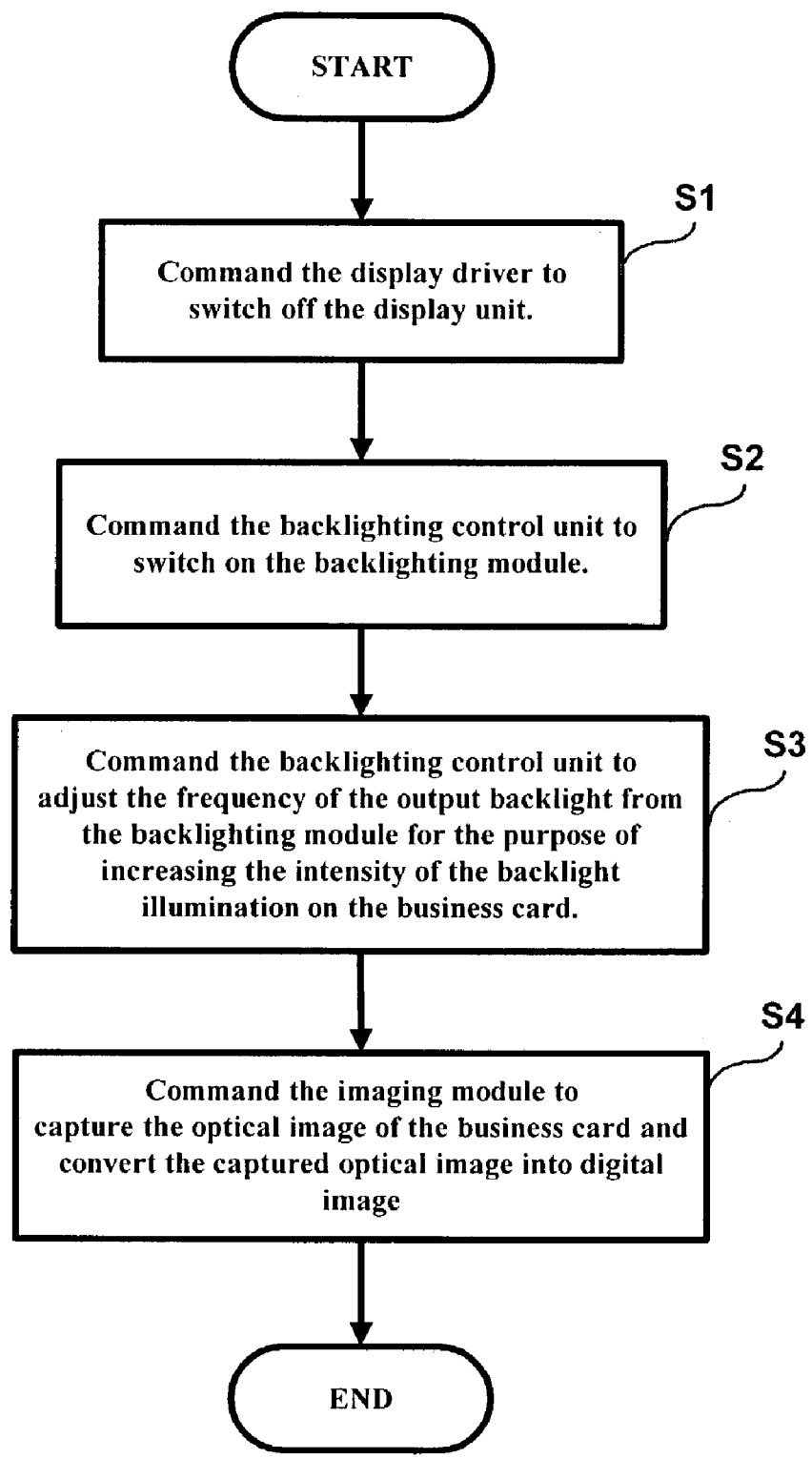
FIG. 2 is a flow diagram showing the procedural steps of the operation of the backlight controlled closeup photographing system of the invention.

FIG. 2 is a flow diagram showing the procedural steps of the operation of the backlight controlled closeup photographing system of the invention 100. To capture the image of the business card 20, the user first needs to aim the imaging module 120 at the business card 20, whereby a digitized image of the business card 20 will be displayed on the display unit 130. The user then needs to adjust the displayed image into focus As the image of the business card 20 is in focus, the user then needs to depress an activation key 111 on the MMV device 10 to activate the main control unit 110 to start executing the procedural steps shown in FIG. 2, which is implemented as software or firmware in the main control unit 110.

In the first step S1, the main control unit 110 commands the display driver 131 to switch off the display unit 130. Then, in the next step S2, the main control unit 110 commands the backlighting control unit 141 to switch on the backlighting module 140. Subsequently, in the next step S3, the main control unit 110 commands the backlighting control unit 141 to adjust the frequency of the output backlight from the backlighting module 140 for the purpose of increasing the intensity of the backlight illumination on the business card 20.

In the subsequent step S4, the main control unit 110 commands the imaging module 120 to capture the optical image of the business card 20 and convert the captured optical image into digital image. During this process, since the display unit 130 is switched off, the backlight illumination on the business card 20 can be intensified, allowing the captured digital image of the business card 20 to have adequate brightness in picture quality. This completes the photographing of one digital image for the business card 20. If more images are desired, the foregoing procedural steps can be repeated to take more pictures. The captured digital image of the business card 20 can then be stored in the internal memory or externally-connected memory modules (not shown) coupled to the MMV device 10 for further processing.

In conclusion, the invention provides a backlight controlled closeup photographing system for use with a multimedia-capable information platform, such as an MMV (MultiMedia Viewer) device, to allow the user to photograph a small object, such as a business card, at close range; and which is characterized by the use of backlight control to increase the intensity of the backlight illumination on the object being photographed for the purpose of allowing the photographed digital image to have adequate brightness in picture quality. Since the intensity of illumination on the object can be increased without using flash unit, the invention is apparently more cost-effective and advantageous to use than prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A backlight controlled closeup photographing system for use with an information platfom, having a photographing function for capturing digital image of an object;

the backlight controlled closeup photographing system comprising:

a main control unit;

an imaging module, which is capable of capturing the object's optical image and converting the captured optical image into a digital image;

a display unit, which is controlled by a display driver under control by the main control unit for displaying the digital image of the object captured by the imaging module; and a backlighting module, which is coupled to the display unit and controlled by a backlighting control unit under control by the main control unit for providing a backlight source to illuminate the object being photographed;

wherein when photographing the object in closeup mode, the main control unit commands the display driver to switch off the display unit and then commands the backlighting control unit to switch on the backlighting module and adjust the frequency of the output backlight from the backlighting module for the purpose of increasing the intensity of the backlight illumination on the object being photographed.

2. The backlight controlled closeup photographing system of claim 1, wherein the information platform is an MMV device.

3. The backlight controlled closeup photographing system of claim 1, wherein the main control unit is a microprocessor-based control unit.

4. The backlight controlled closeup photographing system of claim 1, wherein the imaging module is a CCD-based imaging module.

5. The backlight controlled closeup photographing system of claim 1, wherein the display unit is an LCD-based display unit.

6. A backlight controlled closeup photographing system for use with a MMV device having a closeup photographing function for capturing digital image of an object;

the backlight controlled closeup photographing system comprising: a main control unit;

an imaging module, which is capable of capturing the object's optical image and converting the captured optical image into a digital image;

a display unit, which is controlled by a display driver under control by the main control unit for displaying the digital image of the object captured by the imaging module; and a backlighting module, which is coupled to the display unit and controlled by a backlighting control unit under control by the main control unit for providing a backlight source to illuminate the object being photographed;

wherein when photographing the object in closeup mode, the main control unit commands the display driver to switch off the display unit, and then commands the backlighting control unit to switch on the backlighting module and adjust the frequency of the output backlight from the backlighting module for the purpose of increasing the intensity of the backlight illumination on the object being photographed.

7. The backlight controlled closeup photographing system of claim 6, wherein the main control unit is a microprocessor-based control unit.

8. The backlight controlled closeup photographing system of claim 6, wherein the imaging module is a CCD-based imaging module.

9. The backlight controlled closeup photographing system of claim 6, wherein the display unit is an LCD-based display unit.

* * * * *